United States Patent Office 3,277,495
Patented Oct. 4, 1966

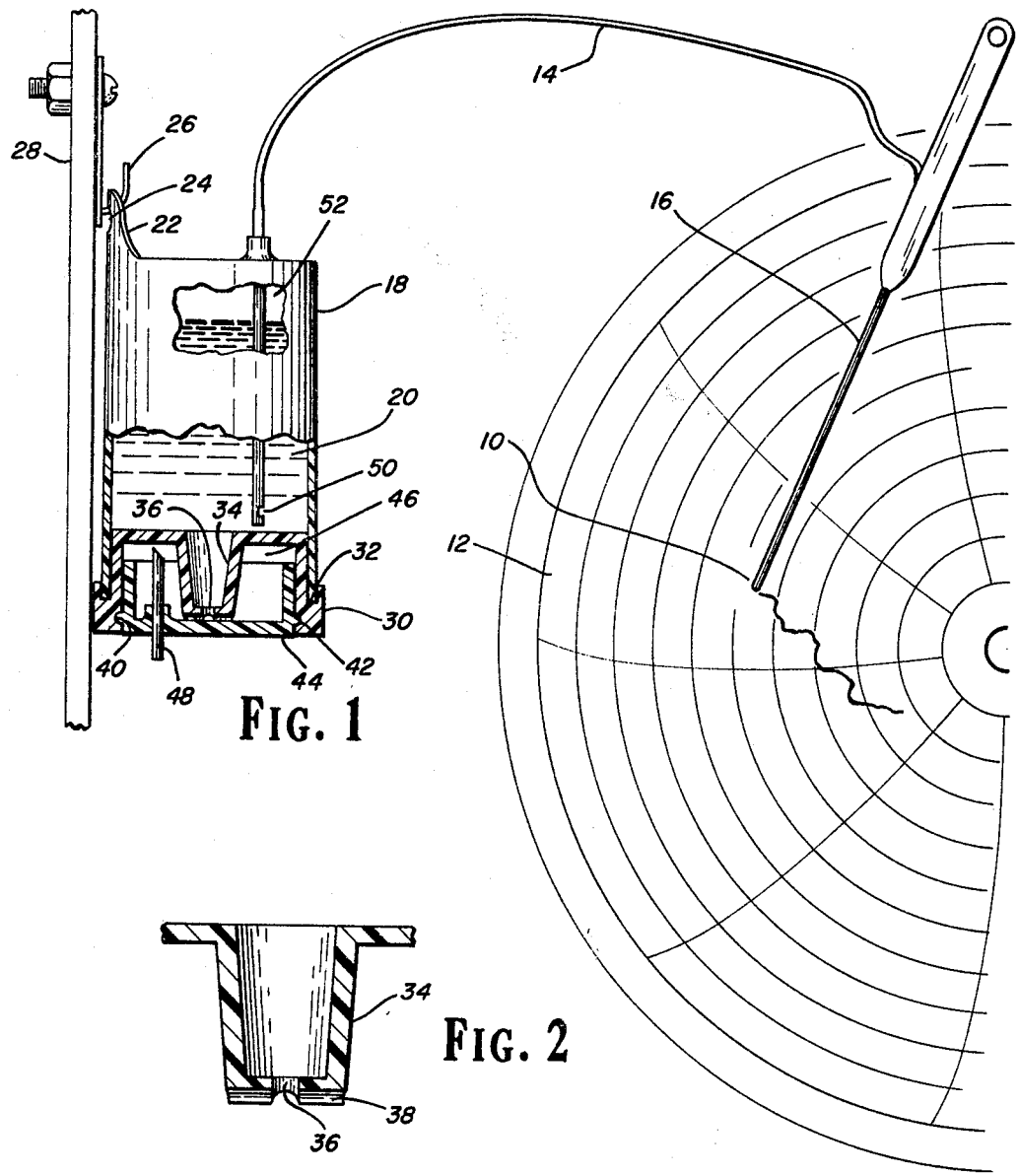

3,277,495
INK SUPPLY SYSTEM
Bruce J. Caldwell, 2523 First City National Bank Bldg.,
Houston, Tex.
Filed Nov. 2, 1964, Ser. No. 408,154
15 Claims. (Cl. 346—140)

The present invention relates to an ink supply system for an ink stylus.

Many types of recording devices rely on a stylus having its point in engagement with the surface of the recording chart and the ink fed to the stylus being deposited on the surface of the recording chart for the desired recording. Ink, being a solution, is subject to deterioration when it is exposed to atmosphere because of the natural evaporation of the solute from the solution. Further ink which is exposed to the atmosphere may be contaminated by dirt and possibly by bacteria. The contaminants and evaporation will all reduce the quality of the ink in the supply system and may even cause a failure of this system by a clogging of the line connecting the reservoir to the stylus. Additional difficulties have been encountered in such ink supply systems in that often the ink reservoir is subjected to freezing conditions and in such events antifreeze liquids are added to the ink. It is preferable to be able to add an alcohol type of antifreeze liquid but where the ink in the reservoir is exposed to atmospheric conditions, such alcohol antifreeze liquids are quite volatile and will evaporate, thus exposing the ink to freezing conditions. Alcohol type of antifreeze liquids are preferred since they will readily evaporate when the ink is deposited on a chart while other antifreeze liquids, being less volatile and therefore maintaining the antifreeze protection, do not make a satisfactory tracing on a chart since such antifreeze liquids do not readily evaporate and therefore ink containing such liquids is very slow to dry. Another disadvantage of prior systems has been that as the level of ink in the reservoir varies with respect to the stylus that such levels must be readjusted by either moving the reservoir or by adding more ink. With prior systems the falling of the ink level in the reservoir may be a sufficient change in level that no further ink will be delivered to the stylus and a filling of the reservoir to a level substantially above the stylus may cause the ink to flood out through the stylus.

It is therefore an object of the present invention to provide an ink supply system having a closed reservoir to provide an ink supply system having a closed reservoir to prevent contamination of the ink supply and to further prevent deterioration of the ink resulting from evaporation of the solute from the ink.

Another object of the present invention is to provide an ink supply system having compensation for the depth of ink above the inlet to the conduit which extends between the reservoir and the stylus whereby substantially the same pressure is maintained at the opening to such conduit.

Another object of the present invention is to provide an ink supply system for a stylus with uniform supply of ink independent of the level of ink in the reservoir.

Still another object of the present invention is to provide an ink supply system for a stylus in which the ink within the system reservoir is exposed to reduced pressure whereby dissolved air and bubbles are removed from the ink.

A further object of the present invention is to provide an ink supply system for a stylus which may readily use alcohol antifreeze liquids in the ink preventing any substantial evaporation of such antifreeze liquids to maintain protection against freezing of the ink.

A still further object of the present invention is to provide an ink supply system for a stylus having compensation for volumetric changes of the ink and air within the reservoir.

Still another object of the present invention is to provide an ink supply system for a stylus having provision to prevent air bubbles from entering the connection between the ink reservoir and the stylus.

A still further object of the present invention is to provide an ink supply system for a stylus having a compensating chamber positioned at least partially above the lower portion of the reservoir and a passage therebetween to allow air to enter the reservoir or ink to flow from the reservoir to compensate for changes in pressure of the ink at the lower portion of the reservoir, whereby said pressure is maintained substantially constant.

These and other objects of the present invention will be readily understood from the following explantion and description of the details of the system which is illustrated in the accompanying drawings wherein:

FIGURE 1 is an elevation view of the ink supply system of the present invention having portions of the container shown partially in section to illustrate the details thereof.

FIGURE 2 is an enlarged cross-sectional view of the downwardly projecting portion of the bottom closure and illustrating the passages defined in the lower portion thereof.

FIGURE 3 is a bottom view of the lower end of the projection illustrated in FIGURE 2 and showing the radial arrangement of the passages formed in the bottom of such projection.

Referring more in detail to the drawings the system of the present invention in FIGURE 1 is shown supplying ink to the stylus 10 which is engaged on the surface of the circular chart 12 to record a condition which is desired to be recorded. The conduit 14, which is at least partially flexible so that it does not interfere with the movement of the stylus arm 16, connects from the stylus 10 into container 18. Suitable sealing means (not shown) is provided in the upper portion of container 18 around conduit 16 which extends downwardly into reservoir chamber 20 within container 18.

Container 18 is shown to be provided with support means which includes the projection 22 having a hole 24 therein to receive the hook 26 which is secured to a support member 28. Any suitable support means may be used for container 18 provided it supports container 18 in the proper relation to stylus 10 as hereinafter more fully set forth.

Container 18 is closed at its lower end by bottom closure member 30. Bottom closure member 30 is provided with an upwardly facing annular slot 32 into which the lower edge of container 18 fits in tight engagement. The central portion of closure member 30 projects downwardly as hub 34. The lower portion of hub 34 is flat and provided with central aperture 36 which is open to each of the radial grooves 38. Grooves 38 are semicircular in cross section.

The inner surface of the outer portion of bottom closure member 30 includes the annular recess 40 which is to receive the projection 42 surrounding cup-shaped closure member 44. The closure member 44 and the closure member 30 define the annular compensating chamber 46 above member 44 and surrounding hub 34. The vent tube 48 extends through closure member 44 and terminates in the upper portion of compensating chamber 46.

As shown the radial grooves 38 and the upper surface of closure member 44 define the capillary passages connecting between the compensating chamber 46 and the aperture 36 connecting to the reservoir chamber 20 which is defined by the interior of container 18 and the upper side of bottom closure member 30.

It should be noted that the inlet 50 to the part of conduit 14 which extends downwardly within container 18 is positioned out of line with aperture 36 for reasons hereinafter explained. Container 18 contains a supply of ink in reservoir chamber 20. The zone 52 of reduced pressure is within reservoir chamber 20 above the supply of ink.

To operate the system of the present invention it is first necessary to invert container 18 and remove bottom closure 30. Container 18 is then substantially filled with the ink to be used and bottom closure 30 replaced on container 18 before righting container 18. With both closures 30 and 44 in place, the container is righted and the ink will be in the lower portion of reservoir chamber 20 and any air will be in zone 52 above the ink. Since zone 52 is not directly vented, any reduction in the level of ink will tend to reduce the pressure in zone 52. This reduced pressure causes the desired deaeration of the ink and will assist in preventing ink from flowing out of reservoir chamber 20 through aperture 36 and grooves 38. The area of grooves 38 is sufficiently small that no substantial flow of ink will pass therethrough. The pressure in compensating chamber 46 will be exerted against the outer ends of the grooves 38 and the head pressure of the ink will be reduced by virtue of the reduced pressure in the zone 52.

To operate stylus 10 it is only necessary to apply a slight suction with a syringe or other suitable device to stylus 10 and ink will flow into inlet 50 and through conduit 14 into the stylus 10 to be ready for tracing the position of stylus 10 on chart 12.

It is suggested that the writing point of stylus 10 be positioned at approximately the level of inlet 50 to conduit 14 to assure that ink will flow regardless of the level of ink within reservoir chamber 20. The system of the present invention will function properly with the bottom of container 18 positioned at the lowest point of tread of the stylus 10 as shown in FIGURE 1. Conduit 14 is preferably a capillary tube which will conduct the ink to stylus 10 and will not be dependent upon a siphon effect.

As the volume of ink within reservoir chamber 20 is reduced, either by use of ink on chart 12 or by a decrease in volume responsive to a reduction of temperature, a small amount of air will flow into compensating chamber 46 through vent tube 48 and inwardly through grooves 38 and be discharged upwardly through aperture 36 as a bubble which will rise through reservoir chamber 20 into zone 52 above the level of ink. In this way any decreases in pressure in zone 52 resulting from a decrease in ink volume will be compensated by a slight flow of air into container 18 through the grooves 38. In the event that, by virtue of increased temperature, the volume of ink in reservoir chamber 20 increases or if external pressure decreases, then a small amount of ink will flow through grooves 38 into compensating chamber 46 which will again equalize the pressure between compensating chamber 46 and reservoir chamber 20.

It should be noted that the bubbles rising in reservoir chamber 20 to compensate for a decrease in volume will be spaced from inlet 50 of conduit 14 and therefore air will not enter conduit 14 even when there is a flow of ink therethrough. The displacement of inlet 50 away from a position vertically above aperture 36 is important to prevent air from entering conduit 14 and which could cause stylus 10 to skip or could effectively stop the feeding of ink to stylus 10.

The space defined by grooves 38 and the upper surface of closure 44 are extremely small and are preferred to be capillary size spaces to limit the amount of flow of ink into compensating chamber 46 when the container 18 is originally filled and righted.

As the level of the ink in reservoir chamber 20 decreases, the pressure above the ink would be reduced and prevent further flow of ink through conduit 14; but this reduced pressure is compensated by the bubble of air from compensating chamber 46 and the flow of ink will be uninterrupted.

The arrangement of the system however, prevents the ink from being directly vented to the atmosphere, and during most operations the small amount of breathing due to volume changes will be compensated by movement of the ink in the grooves 38. The pressure compensation will maintain a substantially constant pressure at inlet 50 to conduit 14, thereby assuring the smooth flow of ink. This limited venting of the reservoir chamber 20 will protect the ink in reservoir chamber 20 from contamination. Only that small amount of air which is originally contained within container 18 and that which bubbles up through the ink to compensate for volume changes in the ink will come into contact with the ink. There will not be a constant breathing of the air above the ink in the reservoir chamber 20 as takes place in other ink supply systems.

From the foregoing it can be seen that the present invention provides an ink supply system having a closed reservoir in which the ink is protected from contamination, is subjected to a reduced pressure at its upper surface to remove entrained or dissolved air, provides a constant pressure supply of ink at the inlet to the conduit connecting to the stylus, provides a reservoir chamber which may be used in extremely cold weather with an alcohol antifreeze liquid without the danger of excessive evaporation of the liquid, and further provides an ink supply system which compensates for volumetric changes of the ink within the reservoir chamber.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An ink supply system for an ink stylus comprising,
    an ink stylus,
    a container defining a reservoir chamber,
    said reservoir adapted to be filled in inverted position with a supply of ink for said stylus,
    a capillary conduit extending from within said reservoir chamber to said stylus, and
    a vent passage into the lower portion of said reservoir chamber,
    the ink in said reservoir chamber being in the lower portion thereof when said container is righted,
    said reservoir chamber having a zone of reduced pressure above the ink contained therein,
    said vent passage being a capillary passage adapted to compensate for volume changes in said reservoir chamber by flow of air into said reservoir chamber when volume of ink decreases and flow of ink out of said reservoir chamber when the volume of ink increases.

2. An ink supply system for an ink stylus comprising,
    an ink stylus,
    a container,
    a bottom closure for said container,
    said container defining a reservoir chamber adapted to be filled in inverted position with a supply of ink for said stylus and then closed by installing said bottom closure,
    a capillary connection extending from a position within said reservoir chamber to said stylus,
    a compensating chamber,
    a passage connecting between the lower portion of said reservoir chamber and said compensating chamber,
    said compensating chamber extending to a position above the lower portion of said reservoir chamber whereby when said container is returned to upright position after filling, the ink within said reservoir chamber will be retained within said reservoir chamber and a zone of reduced pressure will be created above the ink within said reservoir chamber, and a vent connection extending into said compensating chamber at a position above said passage between said reservoir chamber and said compensating chamber whereby said compensating chamber will contain the vent gas or ink resulting from compensations for volume changes within said reservoir chamber, said passage between said reservoir chamber and said compensating chamber being a capillary passage.

3. An inking supply system for an ink stylus comprising,
a container defining an ink reservoir,
a stylus,
an ink conduit extending from within said ink reservoir to said stylus,
sealing means in the wall of said reservoir and surrounding said ink conduit to provide an air-tight seal between the exterior of said ink conduit and the wall of said container,
a bottom closure for said reservoir,
a compensating chamber closure,
a compensating chamber defined by said bottom closure and said compensating chamber closure,
a capillary passage connecting the lower portion of said reservoir with the lower portion of said compensating chamber,
said compensating chamber extending to a position above the lower portion of said reservoir,
the opening in said ink conduit positioned within the lower portion of said reservoir out of vertical alignment with said capillary passage, and
a vent tube extending into the upper portion of said compensating chamber whereby the pressure within said compensating chamber is maintained at the pressure surrounding said reservoir,
said reservoir adapted to be filled in inverted position with a supply of ink whereby when said reservoir is returned to upright position the pressure in the space above the ink supply within said reservoir will be less than the pressure within said compensating chamber.

4. An ink supply system for an ink stylus, comprising
a container defining a reservoir chamber,
a bottom closure for said container,
means defining a compensating chamber,
means connecting the lower portion of said reservoir chamber to the lower portion of said compensating chamber,
said connecting means defining a capillary passage between said chambers,
means extending from said reservoir chamber to supply ink to the ink stylus, and
a vent connection into the upper portion of said compensating chamber.

5. An ink supply system according to claim 4, wherein said means supplying ink to the ink stylus includes
a capillary tube extending through the wall of said container and having an inlet within said reservoir chamber,
said inlet of said capillary tube being out of vertical alignment with the point of connection of said connecting means into said reservoir chamber.

6. An ink supply system adapted to supply ink to an ink stylus, comprising
a container defining an ink reservoir,
an ink conduit extending from within said ink reservoir to the ink stylus,
a bottom closure for said ink reservoir,
a compensating chamber closure,
said bottom closure and said compensating chamber closure defining a volume compensating chamber and a capillary passage connecting the lower portion of said ink reservoir to the lower portion of said compensating chamber, and
a vent tube extending into the upper portion of said compensating chamber,
said ink reservoir adapted to be filled in inverted position with a supply of ink and righted to provide a pressure in said ink reservoir above the supply of ink less than the pressure in said compensating chamber.

7. An ink supply system according to claim 6, wherein the inlet of said ink conduit within said ink reservoir is positioned out of vertical alignment with point of opening of said capillary passage into said ink reservoir.

8. An ink supply system according to claim 6, wherein said bottom closure defines a well in the lower portion of said ink reservoir, and
said compensating chamber surrounds and extends to a position above the lower portion of said well.

9. An ink supply system according to claim 8, wherein the inlet of said ink conduit is positioned in said ink reservoir above and out of vertical alignment with said well.

10. An ink supply system for an ink stylus, comprising
a container,
a first closure for said container,
said first closure and said container defining an ink reservoir chamber and an outlet therefrom at the bottom of said reservoir chamber,
a second closure adapted to engage said first closure and defining therewith a volume compensating chamber,
said outlet connecting through a capillary passage defined by said closure to the lower portion of said volume compensating chamber,
a capillary tube connecting from within said ink reservoir chamber to the ink stylus, and
means connecting into the upper portion of said volume compensating chamber to equalize the pressure within said chamber with the external pressure around said container.

11. In an ink supply system for an ink stylus, the subcombination comprising
a container defining a reservoir chamber,
means for delivering ink from said revervoir chamber to supply ink to the ink stylus,
means defining a volume compensating chamber,
means connecting the lower portion of said reservoir chamber to the lower portion of said volume compensating chamber,
said connecting means defining a capillary passage between said chambers, and
vent means connecting into the upper portion of said volume compensating chamber to equalize the pressure in said volume compensating chamber.

12. The subcombination according to claim 11, wherein
the inlet of said ink delivering means is positioned within said reservoir chamber out of vertical alignment with the point of connection of said connecting means into said reservoir chamber.

13. The subcombination according to claim 11, wherein said reservoir chamber is adapted to be filled in inverted position with a supply of ink and righted to provide a pressure in said reservoir chamber above the supply of ink less than the pressure in said volume compensating chamber.

14. In an ink supply system for an ink stylus, the subcombination comprising
a container defining an ink reservoir,
a capillary tube extending from within said ink reservoir out of said container,
a bottom closure for said ink reservoir, a compensating chamber closure, said closures defining a compensating chamber and a capillary passage connecting the ink reservoir and said compensating chamber, and a vent tube extending into the upper portion of said compensating chamber, said ink reservoir adapted to be filled in inverted position with a supply of ink and righted to provide a pressure in said ink reservoir above the supply of ink less than the pressure in said compensating chamber.

15. In an ink supply system for an ink stylus, the subcombination comprising a container, a bottom closure for said container, said container and said bottom closure defining an ink reservoir, a second closure cooperating with said bottom closure to define a volume compensating chamber, said bottom closure and said second closure defining a passage between said ink reservoir and said volume compensating chamber, a portion of said passage extending in a generally horizontal direction, and means for delivering ink from said ink reservoir to supply ink to the ink stylus.

References Cited by the Examiner

UNITED STATES PATENTS

| | | | |
|---|---|---|---|
| 2,176,777 | 10/1939 | Tate | 346—140 |
| 2,800,385 | 7/1957 | Cannon | 346—140 |
| 3,046,556 | 7/1962 | Summers et al. | 346—140 |

OTHER REFERENCES

Siemens and Halske, German application 1124715, printed March 1, 1962, KL. 42d 3/20.

RICHARD B. WILKINSON, *Primary Examiner.*

LOUIS J. CAPOZI, *Examiner.*

JOSEPH W. HARTARY, *Assistant Examiner.*